UNITED STATES PATENT OFFICE.

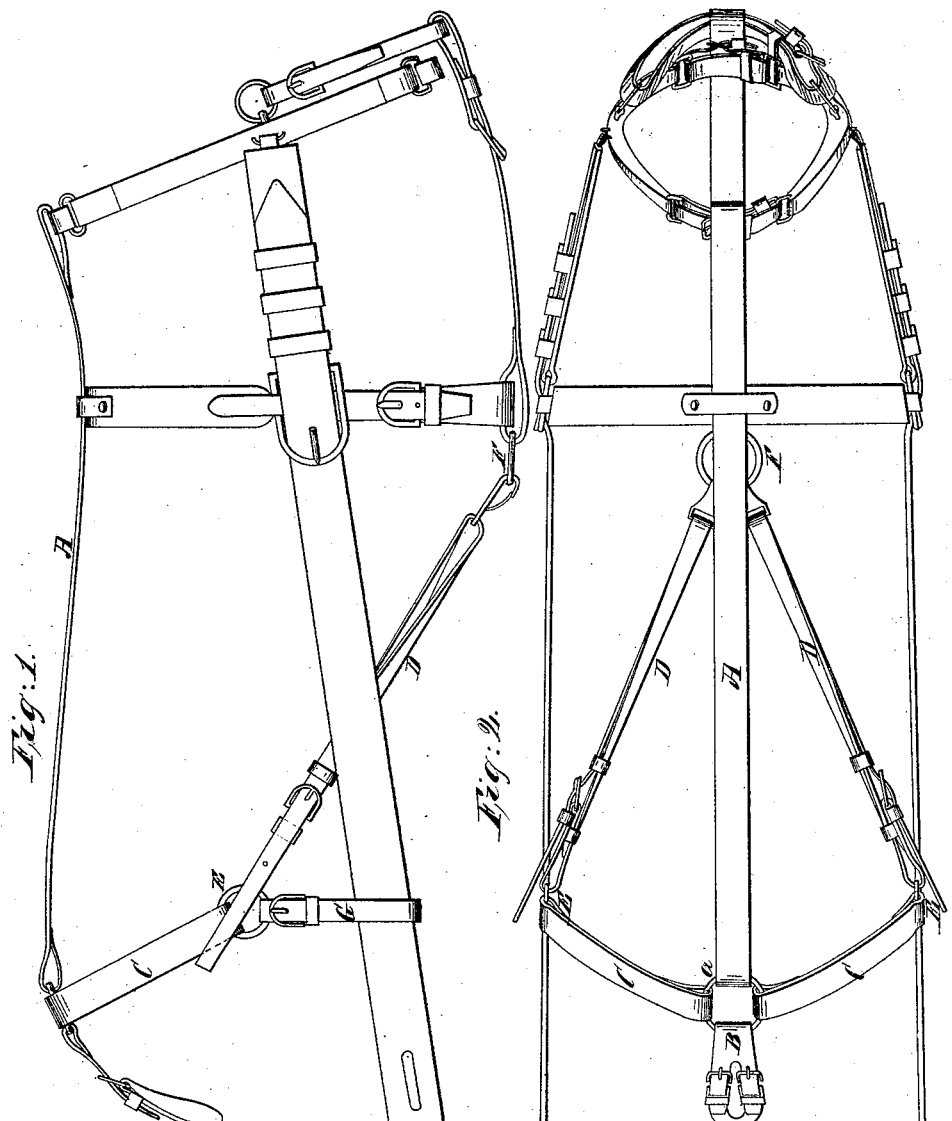

JEROME CALKINS, OF HUDSON, MICHIGAN.

IMPROVED HARNESS.

Specification forming part of Letters Patent No. 48,790, dated July 18, 1865.

*To all whom it may concern:*

Be it known that I, JEROME CALKINS, of Hudson, in the county of Lenawee and State of Michigan, have invented certain new and useful Improvements in Harness; and I do hereby declare that the following is a full, clear, and exact description of the same, reference being had to the accompanying drawings, making part of this specification.

The nature of my invention relates more particularly to those portions of the harness which enable a horse to hold back, and which will be hereinafter more particularly described.

In the annexed drawings, Figure 1 represents a side view, and Fig. 2 a plan view, of my invention.

In this harness the hames, collar, martingale, saddle, and belly-band can be made in any of the usual and known ways.

Upon the drawings, A represents the back-strap, which is connected by a loop to the strap which connects the hames at their upper extremities. This back-strap passes back and attaches to a ring, a, which rests on the animal's back between his hips. The crupper B also attaches to the ring a.

C C are two straps, which are attached at one end to the ring a, and at their other ends to the rings E E, which are located near the flanks of the horse or animal on which the harness is placed.

D D represent two straps which loop in the rings E E at one end, and which pass forward and attach at their other ends to the ring F by means of a catch or any known adjustable fastening. The ring F is attached to the martingale near where the belly-band passes through said martingale. The straps D D are provided with buckles, by means of which they can be shortened or lengthened to suit circumstances, the size of horses, &c. The object of this arrangement is to enable a horse to hold back without employing the ordinary breeching. The straps D D, connected as they are with the straps C C, throw the pressure in holding back upon the horse's rump, instead of trammeling his thighs, as is the case with the ordinary breeching-straps.

The advantages which I claim for my method of construction are—

First, by dispensing with the breeching, and substituting in lieu thereof the straps C C, I avoid the chafing of the horse, which is inseparable from the use of breeching in harness, and leave his hinder legs free and untrammeled in their action.

Second, I claim the advantage of greater lightness, and a saving of from four to eight dollars in the manufacture of a pair of harness.

Having thus described my invention, what I claim, and desire to secure by Letters Patent, is—

Arranging and connecting the straps D D with the rings E E, straps C C, ring a, and with the ring F, substantially as and for the purpose specified.

JEROME CALKINS.

Witnesses:
J. R. HYDE,
LORENZO PALMER.